June 14, 1960 P. V. WILLARD 2,940,652
CAR TOP HOLDING DEVICE
Filed July 19, 1957 2 Sheets-Sheet 1
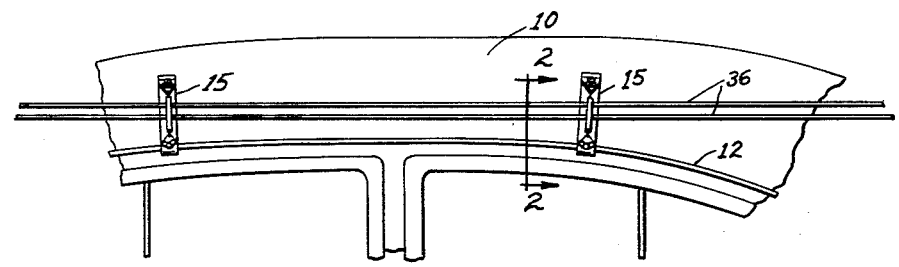
Fig. 1
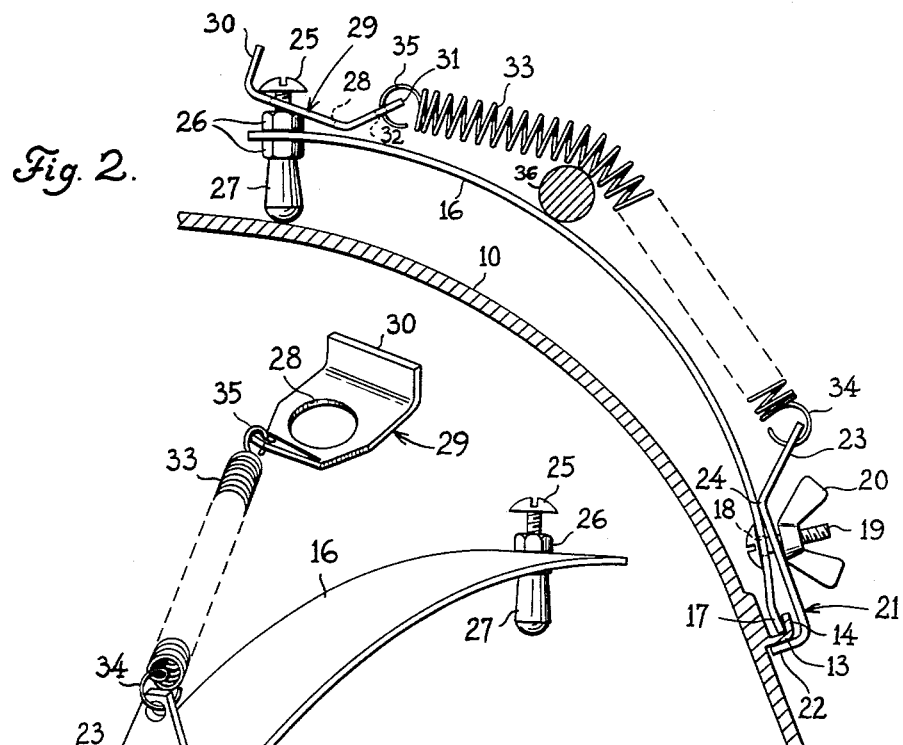
Fig. 2.
Fig. 3
INVENTOR:
Paul V. Willard
By James E. Nilles
Attorney

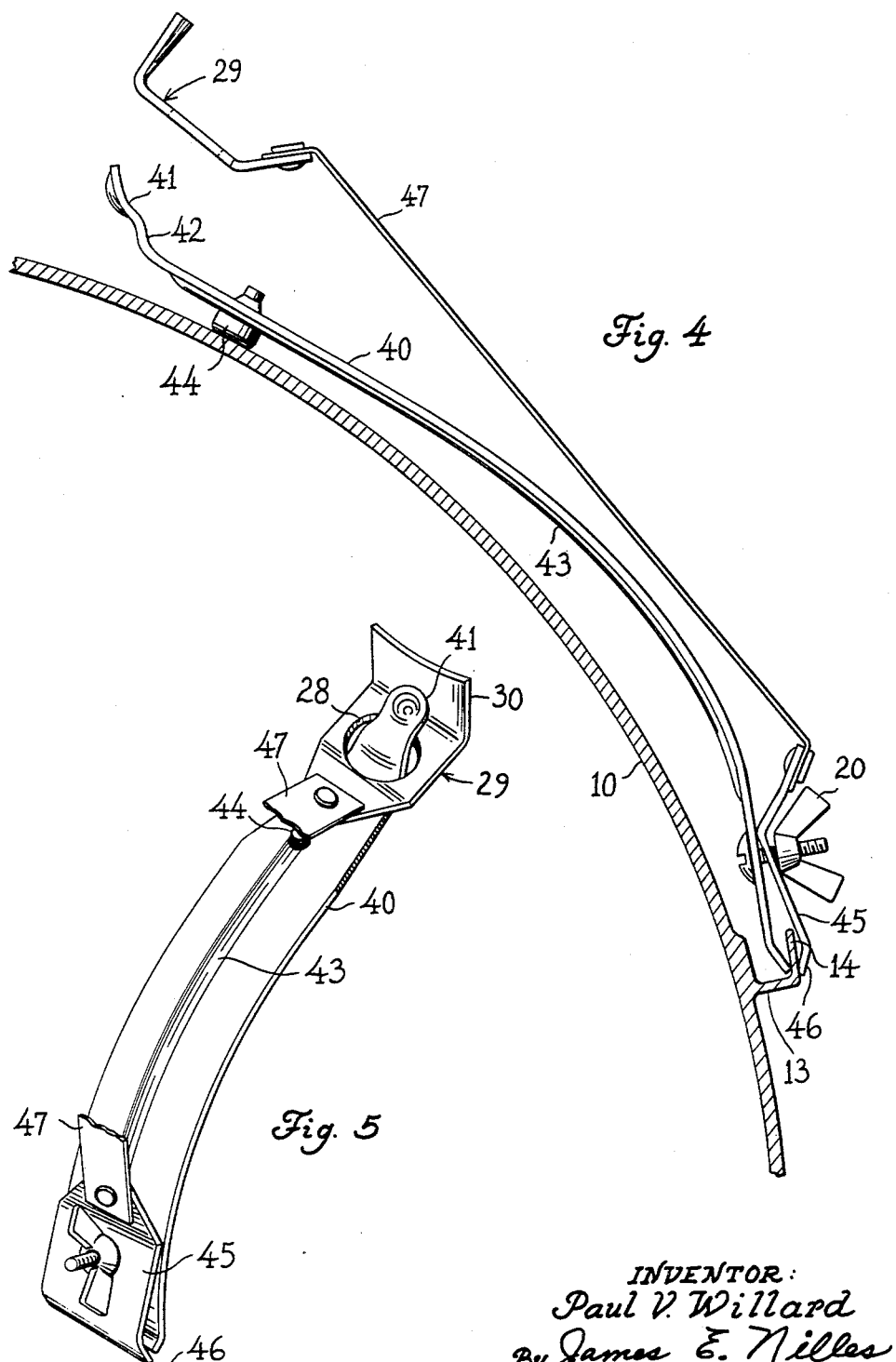

United States Patent Office 2,940,652
Patented June 14, 1960

2,940,652

CAR TOP HOLDING DEVICE

Paul V. Willard, Racine, Wis., assignor of one-half to Clifford Thordson and one-half to David W. Barrows Filed July 19, 1957, Ser. No. 672,979

1 Claim. (Cl. 224—42.1)

This invention relates to holding devices of the type that are adapted to be clamped to the top of an automobile for holding articles thereon.

Many such prior art clamping devices extend across the top of the automobile and are fastened at each side. Such devices are often inconvenient to install and take off, and the effort required to do so often outweighs the necessity for the device, particularly when it is desired to only carry lightweight articles, such as fishing poles.

Many of these conventional devices are usable only with certain model cars which have tops of a definite configuration, and are therefore not universally suited for all vehicles.

In accordance with this invention, there is provided a compact clamping device which is easily installed from only one side of the auto top, and which is adapted to fit almost all types of automobile without alteration or special attaching parts. The device can be removed as a unit and without first removing the articles to be held. In other words, when several objects, such as fishing poles, are held by the clamps of this invention, the clamps can be quickly removed from the auto with the poles still in the clamps. Thus the clamps also act as a lightweight carrying device for the poles.

Other objects and advantages of the invention will appear hereinafter as this disclosure progresses, reference being had to the accompanying drawings in which:

Figure 1 is a fragmentary perspective view of an automobile top to which has been fastened two clamping devices made in accordance with this invention;

Figure 2 is an elevational view, taken generally on line 2—2 of Figure 1, on an enlarged scale, but showing one of the clamping units with only one article therein;

Figure 3 is a perspective view of one of the clamps in the open position;

Figure 4 is an elevational view, a modification of the invention in the open position; and Figure 5 is a perspective view of the device of Figure 4, with a part broken away for clarity.

Referring in greater detail to the drawings, an auto top 10 is of curved configuration and has a trough drip edge 12 along each side. The edge 12 includes a generally outwardly turned flange 13 which forms the bottom of the trough, and a generally upwardly turned flange 14 forming the outer side of the trough. Most autos have drip edges of this general shape.

As shown in Figure 1, two clamping units 15 are secured along one side of the auto top and at spaced locations. The spacing of these units may be varied, depending on the front to rear curvature of the auto top and also depending on the length of the articles to be carried. Any number of units may be used. For instance, one unit would be used where short objects are to be carried, or three units may be used where a long article, such as a long cane fishing pole, or similar article, is to be transported.

The units are easily and quickly attached to or detached from the drip edge 12 without the use of special tools and without the necessity of climbing on the car.

A base member 16 is formed of sheet steel and is generally curved to coincide with the transverse curvature of the auto top. The lower end of the base member is adapted to fit in the trough formed by the drip edge and has a slightly outwardly flared end portion 17. Adjacent the lower end is an aperture 18 extending through the member 16 for the reception of bolt 19 which has a large wing nut 20 threadably engaged on its upper end.

A clamp member 21 has a flange 22 at its lower end which forms an approximately right angle with the major length of the clamp member. The flange 22 is adapted to fit around the lower side of the drip edge 12 when in the clamping position. At the other end the clamp member has an outwardly turned portion 23 which has an aperture adjacent its outer end. The intermediate portion 24 of the clamp member is adapted to bear against base member 16 and an aperture extends through the clamp member adjacent intermediate portion 24.

When the wing nut 20 is tightened, members 16 and 21 engage the drip edge in a rigid manner.

At the other end of base member 16 a bolt 25 extends therethrough and is held captive therein by nuts 26. A rubber bumper 27 is securely mounted on the lower end of the bolt and bears against the auto top 10, holding the base member 16 a distance away from the top. The upper end of the bolt extends a distance above the base member 16 so as to form a catch for the large aperture 28 in the hook 29.

The hook 29 includes an outwardly extending flange portion 30 by which it may be readily grasped. The other end of the hook terminates in another outwardly extending flange 31 having an aperture 32.

A resilient flexible member in the form of coil spring 33 has hooks 34 and 35 at its ends for being engaged in the apertures in the clamp and hook members 23, 29, respectively.

When the hook 29 is engaged on the bolt catch, the spring 33 is under tension or extended a certain amount, thus able to firmly hold objects 36 against the base member.

When the wing nuts are tightened and the drip edge tightly held by the base and clamp members, the rubber tip of the other end of the clamp unit is held tightly against the car top. No rattling or bouncing of the unit on the top can occur.

With the clamp units in place as shown in Figure 1, to remove the objects 36 therefrom it is only necessary to grasp the portion 30 of hook 29, extend the spring slightly thus freeing aperture 28 from its captive position on the bolt. The objects 36 are then completely free to be lifted from the clamps.

In the modification of the invention shown in Figures 4 and 5, the base member 40 has its upper end gradually reduced in width and terminates in an outwardly turned portion 41 which forms the catch for the hook 29. The aperture 28 slips over the catch 41 and bears against its intermediate outwardly turned portion 42. Member 40 is formed preferably by a stamping operation and a reinforcing channel 43 extends therealong. A rubber stop or bumper 44 is securely held in an aperture adjacent the upper end of member 10, and bears firmly against the car top 10 when in the operative position.

The clamp 45 of the modified form terminates at its lower end in an inwardly turned flange 46 which is adapted to grasp the outer wall 14 of the drip edge, as shown in Figure 4. When the thumb nut 20 is tightened the upper end of member 43 is biased downwardly, thus causing bumper 44 to bear firmly against the top, thereby preventing any rattling or looseness of the unit. This feature of loading the holding unit toward the top by the clamping action of the clamp occurs regardless of the exact shape of the drip edge involved.

The modified form of the resilient flexible member is in the nature of a flat elastic band 47 which is riveted or otherwise secured to both the clamp and hook. When in the holding position, the band is under tension and firmly holds the articles 36 against the top 10 without marring the articles.

It may be desirable to remove the numerous objects, such as long, flexible and unwieldly fishing poles, from the car top as a bundle and without the necessity of unloading and handling them individually. In that case, the thumb screws would be loosened thus freeing the clamp members from their grip on the drip edge. The clamp units remain assembled, however, retaining the objects firmly held by the springs.

The clamping units made according to the present invention are light in weight and easily installed on almost any auto top without the necessity of special tools and from one side of the auto. They are easily loaded and unloaded, and can be removed with the objects remaining therein in assembled relationship.

Various modes of carrying out the invention are contemplated as being within the scope of the following claims particularly pointing out and distinctly claiming the subject matter which is regarded as the invention.

I claim:

A holding device for an automobile top having a trough drip edge, said device comprising, a rigid and one piece base member having a lower end adapted to fit into said trough, said base member extending above and partially across said top in spaced relationship therefrom and generally conforming to the contour thereof and terminating in an upper end, a bumper secured to said base member and adjacent said upper end to thereby hold said base member in said spaced relationship to said top, a clamp member detachably secured adjacent said lower end of said base member and having at one end an inwardly turned flange adapted to embrace said edge and to bear against said trough below the lower end of said base member, said clamp member at its other end having an outwardly turned portion, said clamp also having an intermediate portion which bears against said base member, means for detachably securing said clamp intermediate portion and base member together to thereby rigidly embrace said edge between said clamp flange and said base member and bias said bumper against said top, a hook adapted to be detachably secured to said upper end, and a resilient flexible means connected between said hook and said portion for yieldingly holding said hook on said upper end and holding articles against said base member.

References Cited in the file of this patent

UNITED STATES PATENTS

| | | |
|---|---|---|
| 1,552,535 | Beerstecher | Sept. 8, 1925 |
| 2,268,958 | Parten et al. | Jan. 6, 1942 |
| 2,461,897 | Hopkins | Feb. 15, 1949 |
| 2,514,266 | Walslager | July 4, 1950 |
| 2,634,034 | Heck | Apr. 7, 1953 |
| 2,682,982 | Fischer | July 6, 1954 |
| 2,720,350 | Felton | Oct. 11, 1955 |
| 2,782,972 | Binding | Feb. 26, 1957 |

FOREIGN PATENTS

| | | |
|---|---|---|
| 304,925 | Switzerland | Apr. 1, 1955 |
| 317,704 | Italy | May 19, 1934 |
| 1,084,496 | France | July 7, 1954 |